United States Patent
Hara et al.

(10) Patent No.: US 7,501,183 B2
(45) Date of Patent: Mar. 10, 2009

(54) SILICONE RUBBER COMPOSITIONS FOR THE SEALING AND ENCAPSULATION OF ELECTRIC AND ELECTRONIC PARTS

(75) Inventors: Hiroyasu Hara, Gunma-ken (JP); Hideki Sugahara, Gunma-ken (JP); Yoshifumi Inoue, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/252,595

(22) Filed: Sep. 24, 2002

(65) Prior Publication Data

US 2003/0105206 A1    Jun. 5, 2003

(30) Foreign Application Priority Data

Sep. 25, 2001    (JP) .............................. 2001-291034

(51) Int. Cl.
*B32B 9/04*    (2006.01)
*C08L 83/04*    (2006.01)

(52) U.S. Cl. .................. 428/447; 524/400; 524/588; 525/477; 525/478; 528/15; 528/31; 528/32

(58) Field of Classification Search ............. 524/439, 524/440, 588; 528/15, 31, 32, 34
See application file for complete search history.

(56) References Cited

U.S. PATENT DOCUMENTS

| 3,159,601 | A |   | 12/1964 | Ashby |
| 3,159,662 | A |   | 12/1964 | Ashby |
| 3,220,972 | A |   | 11/1965 | Lamoreaux |
| 3,775,452 | A |   | 11/1973 | Karstedt |
| 5,021,494 | A | * | 6/1991  | Toya ........................ 524/404 |
| 5,326,589 | A | * | 7/1994  | Okinoshima et al. .......... 427/79 |
| 5,384,075 | A | * | 1/1995  | Okami ....................... 252/511 |
| 6,309,563 | B1 | * | 10/2001 | Iino et al. .................. 252/514 |
| 6,469,090 | B1 | * | 10/2002 | Azechi et al. ............... 524/492 |
| 2003/0087448 | A1 | * | 5/2003 | Abe et al. ..................... 436/73 |

FOREIGN PATENT DOCUMENTS

| EP | 0 367 562 A2 | 5/1990 |
| GB | 1 179 127    | 1/1970 |

* cited by examiner

*Primary Examiner*—Marc S Zimmer
(74) *Attorney, Agent, or Firm*—Birch, Stewart, Kolasch & Birch, LLP

(57) ABSTRACT

A silicone rubber composition containing 0.5-90% by weight of a metal powder and curable into a non-conductive silicone rubber having a volume resistivity of at least $1 \times 10^9$ Ω·cm is useful for the sealing and encapsulation of electric and electronic parts because the metal powder is sulfided with a sulfur gas into a metal sulfide powder which prevents or retards the sulfur gas from reaching the electric and electronic parts.

7 Claims, 1 Drawing Sheet

SILICONE RUBBER COMPOSITIONS FOR THE SEALING AND ENCAPSULATION OF ELECTRIC AND ELECTRONIC PARTS

This invention relates to silicone rubber compositions for use in the sealing and encapsulation of electric and electronic parts for preventing or retarding the electric and electronic parts from corrosion with sulfur-containing gas.

BACKGROUND OF THE INVENTION

Silicone rubber compositions are traditionally used for the sealing and encapsulation of electric and electronic parts for the purpose of preventing or retarding corrosion and degradation thereof. When electric and electronic parts are exposed to sulfur-containing gases such as sulfur gas and sulfur dioxide gas, conventional silicone rubbers fail to prevent or retard the sulfur-containing gas from reaching the electric and electronic parts. In particular, they are not effective for preventing or retarding corrosion of metal parts.

SUMMARY OF THE INVENTION

An object of the invention is to provide a silicone rubber composition for the sealing and encapsulation of electric and electronic parts, which composition can prevent or retard sulfur-containing gas from reaching the electric and electronic parts.

It has been found that the above object is achieved by a silicone rubber composition which contains 0.5 to 90% by weight of a metal powder and is curable into an electrically non-conductive silicone rubber having a volume resistivity of at least $1 \times 10^9$ $\Omega \cdot$cm. Especially when the metal powder is copper or analogous metal which is sulfidable with a sulfur-containing gas, it is converted upon contact with the gas into a metal sulfide powder which prevents or retards the sulfur-containing gas from reaching the electric and electronic parts.

According to the invention, there is provided a silicone rubber composition for the sealing and encapsulation of electric and electronic parts, comprising 0.5 to 90% by weight of a metal powder, the composition curing into a non-conductive silicone rubber having a volume resistivity of at least $1 \times 10^9$ $\Omega \cdot$cm.

In a preferred embodiment, the metal powder is sulfidable with a sulfur-containing gas into a metal sulfide powder which prevents or retards the sulfur-containing gas from reaching the electric and electronic parts. Most often, the metal powder is copper.

DESCRIPTION OF THE PREFERRED EMBODIMENTS

Figure 1:
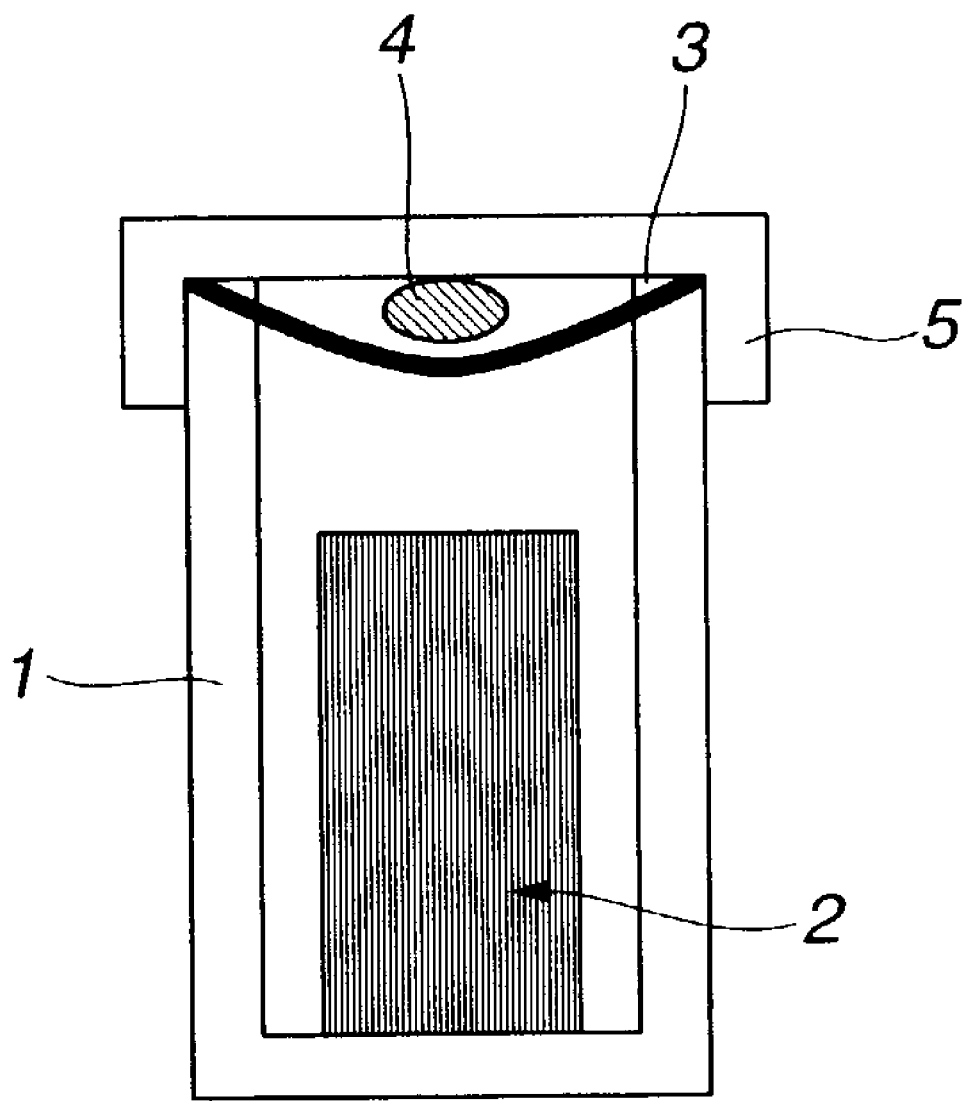
FIG. 1 schematically illustrates a corrosion test.

The silicone rubber composition of the invention contains (A) 0.5 to 90% by weight based on the entire composition of a metal powder and cures into a non-conductive silicone rubber. It is intended for the sealing and encapsulation of electric and electronic parts. If the metal powder is sulfidable with a sulfur-containing gas, the resulting metal sulfide powder can prevent or retard the sulfur-containing gas from reaching the electric and electronic parts.

In a preferred embodiment, the metal powder (A) is sulfidable with a sulfur-containing gas into a metal sulfide powder which prevents or retards the sulfur-containing gas from reaching the electric and electronic parts. Examples of such sulfidable metals include silver, copper, iron, nickel, aluminum, tin and zinc. Of these, copper powder is preferred for stability in the composition and economy.

No particular limits need be imposed on the shape and properties of the metal powder in order for the metal powder to exert the desired effects although an atomized metal powder is preferred for the supply of impurity and fluidity to the composition.

The metal powder is added to the composition in a sufficient amount to prevent or retard the sulfur-containing gas from reaching the electric and electronic parts and specifically, 0.5 to 90% by weight to attain that object. From the standpoints of composition fluidity and cured composition's volume resistivity, the preferred amount is 1 to 70%, and especially 2 to 50% by weight based on the entire composition.

As described above, the metal powder is sulfided with a sulfur-containing gas into a metal sulfide powder which can prevent or retard the sulfur-containing gas from reaching the electric and electronic parts. If the cured silicone rubber becomes conductive (i.e., having a volume resistivity of less than $1 \times 10^9$ $\Omega \cdot$cm), it is unsatisfactory as an electric and electronic part sealant or encapsulant. It is then necessary to acquire a volume resistivity above the specific level. The type and amount of the metal powder must be selected such that the cured silicone rubber composition may have a volume resistivity of at least $1 \times 10^9$ $\Omega \cdot$cm, especially at least $1 \times 10^{10}$ $\Omega \cdot$cm.

The silicone rubber composition used herein may be selected from compositions of various curing types including addition reaction, organic peroxide and condensation curing types. Compositions of the addition reaction curing type are preferred because the process time on use can be shortened. The preferred silicone rubber composition of the addition reaction curing type contains (B) an organopolysiloxane containing at least two alkenyl radicals in a molecule, (C) an organohydrogenpolysiloxane containing at least two hydrogen atoms each attached to a silicon atom in a molecule, and (D) a platinum group metal catalyst. In the silicone rubber composition, (E) at least 0.2 part by weight of finely divided silica per 100 parts by weight of the organopolysiloxane (B) is preferably added for preventing any reduction of volume resistivity by the inclusion of the metal powder and maintaining the composition non-conductive. Optionally, (F) an adhesive agent having at least one functional radical selected from among an epoxy, alkoxysilyl, carbonyl and phenyl radical is added for enhancing the adhesion of the composition to electric and electronic parts or casings thereof. The respective components are described below in detail.

(B) Alkenyl-Containing Organopolysiloxane

The alkenyl-containing organopolysiloxane used herein is an organopolysiloxane containing at least two alkenyl radicals in a molecule. It is generally a linear organopolysiloxane whose backbone is basically composed of recurring diorganosiloxane units and which is blocked at either end with a triorganosiloxy radical, although it may also be branched (containing a branched structure as part of its molecular structure) or cyclic one. For the mechanical strength and other physical properties of the cured composition, a linear diorganopolysiloxane is preferred. The alkenyl radicals may be located solely at both ends of the molecular chain or at both ends and intermediate positions of the molecular chain. Typical alkenyl-containing organopolysiloxanes are diorganopolysiloxanes of the following general formula (1).

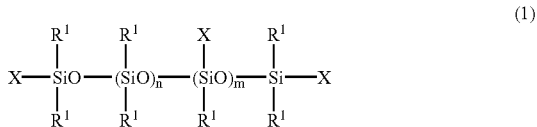

(1)

Herein, $R^1$ is independently a substituted or unsubstituted monovalent hydrocarbon radical free of aliphatic unsaturation, X is alkenyl, n is an integer of 0, 1 or greater, and m is an integer of 0, 1 or greater.

Illustrative, non-limiting examples of the substituted or unsubstituted monovalent hydrocarbon radical free of aliphatic unsaturation represented by $R^1$ include alkyl radicals such as methyl, ethyl, propyl, isopropyl, butyl, isobutyl, tert-butyl, pentyl, neopentyl, hexyl, heptyl, octyl, nonyl, decyl and dodecyl; cycloalkyl radicals such as cyclopentyl, cyclohexyl and cycloheptyl; aryl radicals such as phenyl, tolyl, xylyl, naphthyl and biphenylyl; aralkyl radicals such as benzyl, phenylethyl, phenylpropyl and methylbenzyl; and substituted ones of the foregoing radicals in which some or all of the hydrogen atoms attached to carbon atoms are substituted with halogen atoms (e.g., fluorine, chlorine and bromine), cyano radicals or the like, such as chloromethyl, 2-bromoethyl, 3-chloropropyl, 3,3,3-trifluoropropyl, chlorophenyl, fluorophenyl, cyanoethyl, and 3,3,4,4,5,5,6,6,6-nonafluorohexyl. Typical are those of 1 to 10 carbon atoms, especially 1 to 6 carbon atoms. Preferred are substituted or unsubstituted alkyl radicals of 1 to 3 carbon atoms such as methyl, ethyl, propyl, chloromethyl, bromoethyl, 3,3,3-trifluoropropyl, and cyanoethyl and substituted or unsubstituted phenyl radicals such as phenyl, chlorophenyl and fluorophenyl.

Examples of the alkenyl radical represented by X include those of about 2 to about 8 carbon atoms, such as vinyl, allyl, propenyl, isopropenyl, butenyl, hexenyl and cyclohexenyl. Of these, lower alkenyl radicals such as vinyl and allyl are preferred.

In formula (1), n is an integer of 0, 1 or greater, and m is an integer of 0, 1 or greater. Preferably n and m are integers satisfying $10 \leq n+m < 10,000$, more preferably $50 \leq n+m \leq 2,000$ and $0 \leq m/(n+m) \leq 0.2$.

Preferably, the alkenyl-containing organopolysiloxanes have a viscosity of about 10 to 1,000,000 centistokes (cSt) at 25° C., more preferably about 100 to 500,000 cSt at 25° C.

(C) Organohydrogenpolysiloxane

The organohydrogenpolysiloxane used herein has at least two, preferably at least three hydrogen atoms each attached to a silicon atom (i.e., SiH radicals) per molecule. It may be linear, branched or cyclic, or resinous one of three-dimensional network structure is also acceptable. Typical organohydrogenpolysiloxanes have the following average compositional formula (2).

$$H_a R^2_b SiO_{(4-a-b)/2}$$ (2)

Herein $R^2$ independently stands for substituted or unsubstituted monovalent hydrocarbon radicals free of aliphatic unsaturation, a and b are numbers in the range: $0<a<2$, $0.8 \leq b \leq 2$ and $0.8 < a+b \leq 3$, and preferably $0.05 \leq a \leq 1$, $1.5 \leq b \leq 2$, and $1.8 \leq a+b \leq 2.7$.

Examples of the substituted or unsubstituted monovalent hydrocarbon radicals free of aliphatic unsaturation represented by $R^2$ are as enumerated for $R^1$ in formula (1), typically those of 1 to 10 carbon atoms, especially 1 to 7 carbon atoms, preferably lower alkyl radicals of 1 to 3 carbon atoms (e.g., methyl), phenyl and 3,3,3-trifluoropropyl. Examples of suitable organohydrogenpolysiloxanes include siloxane oligomers such as 1,1,3,3-tetramethyldisiloxane, 1,3,5,7-tetramethyltetracyclosiloxane, and 1,3,5,7,8-pentamethylpentacyclosiloxane; both end trimethylsiloxy radical-blocked methylhydrogenpolysiloxane, both end trimethylsiloxy radical-blocked dimethylsiloxane-methylhydrogensiloxane copolymers, both end silanol radical-blocked methylhydrogenpolysiloxane, both end silanol radical-blocked dimethylsiloxane-methylhydrogensiloxane copolymers, both end dimethylhydrogensiloxy radical-blocked dimethylpolysiloxane, both end dimethylhydrogensiloxy radical-blocked methylhydrogenpolysiloxane, both end dimethylhydrogensiloxy radical-blocked dimethylsiloxane-methylhydrogensiloxane copolymers, silicone resins composed of $R_2(H)SiO_{1/2}$ units and $SiO_{4/2}$ units and optionally, $R_3SiO_{1/2}$ units, $R_2SiO_{2/2}$ units, $R(H)SiO_{2/2}$ units, $(H)SiO_{3/2}$ units or $RSiO_{3/2}$ units wherein R is a substituted or unsubstituted monovalent hydrocarbon radical as enumerated for $R^1$. Also included are organohydrogenpolysiloxanes of the following formulae.

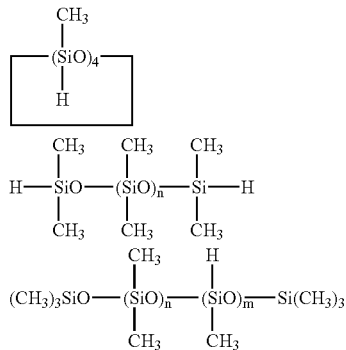

Herein n is an integer of 0 to 200, preferably 0 to 100, m is an integer of 2 to 200, preferably 2 to 100, and n+m is 2 to 400, preferably 2 to 200.

The organohydrogenpolysiloxane used herein may be prepared by well-known methods, for example, by co-hydrolysis of at least one chlorosilane selected from $R^2SiHCl_2$ and $R^2_2SiHCl$ wherein $R^2$ is as defined above, or co-hydrolysis of a mixture of the foregoing chlorosilane and at least one chlorosilane selected from $R^2_3SiCl$ and $R^2_2SiCl_2$ wherein $R^2$ is as defined above. A polysiloxane resulting from such co-hydrolysis may be equilibrated into an organohydrogenpolysiloxane which is also useful herein.

An appropriate amount of the organohydrogenpolysiloxane (C) used is such that 0.5 to 4 mol, preferably 1 to 2.5 mol of silicon-bonded hydrogen atoms (i.e., SiH radicals) in the organohydrogenpolysiloxane (C) are available per mol of alkenyl radicals in the organopolysiloxane (B).

(D) Platinum Group Metal Catalyst

The platinum group metal catalyst used herein serves to promote addition reaction between alkenyl groups in component (B) and silicon-bonded hydrogen atoms in component (C), Well-known catalysts for use in hydrosilylation reaction are useful. Examples include platinum group metal elements such as platinum (inclusive of platinum black), rhodium and palladium; platinum chloride, chloroplatinic acid and salts thereof such as $H_2PtCl_4.nH_2O$, $H_2PtCl_6.nH_2O$, $NaHPtCl_6.nH_2O$, $KHPtCl_6.nH_2O$, $Na_2PtCl_6.nH_2O$, $K_2PtCl_4.nH_2O$, $PtCl_4.nH_2O$, $PtCl_2$, and $Na_2HPtCl_4.nH_2O$ wherein n is an integer of 0 to 6, preferably 0 or 6; alcohol-modified chloroplatinic acid (see U.S. Pat. No. 3,220,972); complexes of chloroplatinic acid with olefins (see U.S. Pat. Nos. 3,159,601, 3,159,662 and 3,775,452); platinum group metals such as platinum black and palladium on supports such as alumina, silica and carbon; rhodium-olefin complexes; chlorotris(triphenylphosphine)rhodium (Wilkinson catalyst); and complexes of platinum chloride, chloroplatinic acid or salts thereof with vinyl-containing siloxanes, especially vinyl-containing cyclic siloxanes.

The catalyst (D) is used in a catalytic amount, typically in an amount to provide about 0.1 to 500 ppm, especially about 0.5 to 200 ppm of platinum group metal based on the weight of components (B) and (C) combined.

(E) Finely Divided Silica

Finely divided silica is an additive effective for maintaining electrical properties of the inventive composition. Since the metal powder (A) functions to increase the conductivity of cured silicone rubber (or reduce the volume resistivity thereof), the electrical properties necessary as a sealant become unsatisfactory as the amount of the metal powder added increases. If finely divided silica is added to this composition, silica particles bind to surfaces of metal particles, prevent metal particles from binding together, and eventually serve to maintain the volume resistivity of cured silicone rubber, that is, maintain the volume resistivity at or above $1 \times 10^9$ Ω·cm.

Finely divided silicas are available in several forms including crystalline, fused and fumed silicas. For the above purpose, addition of fumed silica is most preferred.

To achieve the desired effects, the finely divided silica (E) is preferably added in an amount of at least 0.2 part by weight per 100 parts by weight of the organopolysiloxane (B), For ease of handling of the composition on use, it is recommended to add 0.5 to 30 parts by weight of silica.

(F) Adhesive Agent

An adhesive agent is preferably added although it is an optional component.

The adhesive agent used herein is an organosilicon compound (such as silane or siloxane) having at least one functional radical selected from among an epoxy, alkoxysilyl, carbonyl and phenyl radical. Especially, an organosilane compound having at least one functional group selected from vinyl group, epoxy group, (meth)acryloxy and phenyl group and at least one alkoxysilyl group is preferred. A linear or cyclic organosiloxane oligomer having 4 to 20 silicon atoms and having at least one group selected from epoxy group and alkoxysilyl and at least one hydrogen atom directly attached to silicon atom (i.e., SiH group) is also preferably used. It is preferably a component that makes the inventive composition self-adhesive to metals or organic resins or both.

Illustrative examples of the adhesive agent are given below.

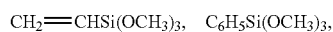

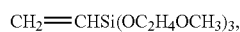

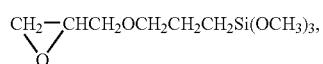

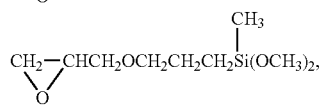

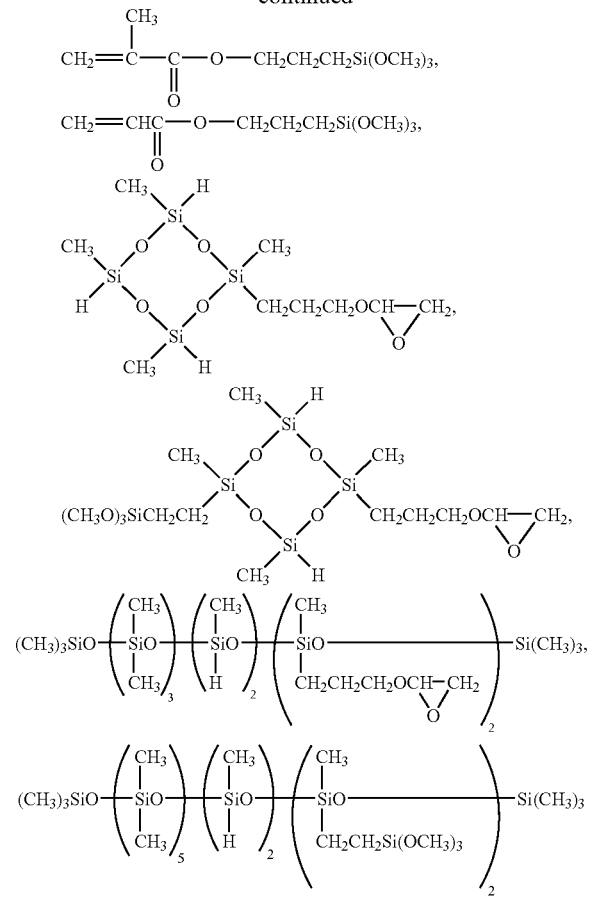

Others

In addition to components (A), (B), (C), (D), (E) and optionally (F), the inventive composition may contain other additives if necessary. Such additives include calcium carbonate; zinc carbonate; reinforcing inorganic fillers such as fumed titanium dioxide; reinforcing silicone resins; and non-reinforcing inorganic fillers such as calcium silicate, titanium dioxide, ferric oxide and carbon black. These inorganic fillers are usually used in amounts of 0 to 200 parts by weight per 100 parts by weight of the remaining components combined.

Curable Silicone Rubber Composition and Cured Product

Like conventional curable silicone rubber compositions, the inventive composition may be of the two part type in which the components are divided into two parts which are to be combined and cured on use. However, it is preferred for ease of working on use that the invention composition be of one part type.

Depending on the service conditions, the inventive composition thus formulated may be prepared as a flowable composition or a thixotropic composition.

The addition curing type silicone rubber composition of the invention may be cured by similar methods under similar conditions as are well known for conventional curable silicone rubber compositions. It effectively cures at room temperature, but may be heated if desired.

The silicone rubber composition of the invention is used for the sealing and encapsulation of electric and electronic parts in a similar manner to well-known sealants and encapsulants. The cured silicone rubber composition or silicone rubber has heat resistance and improved electrical insulation. When a sulfur-containing gas (e.g., sulfur gas, sulfur dioxide gas or sulfide gas) contacts the cured product, the metal powder dispersed in the cured product is sulfided with the sulfur-containing gas whereby the sulfur-containing gas is prevented or retarded from reaching the underlying electric and electronic parts. The electric and electronic parts are thus protected from the sulfur-containing gas.

EXAMPLE

Examples of the invention are given below by way of illustration and not by way of limitation.

Examples & Comparative Examples

Using the stock materials given below, silicone rubber compositions of the one part, addition reaction curing type were prepared to the formulation shown in Table 1.

These compositions were cured under heating conditions of 120° C. and one hour. The cured rubbers were measured for hardness and volume resistivity and subjected to a corrosion test as described below. The results are also shown in Table 1.

Stock Materials
(a) Metal powder

| | |
|---|---|
| (a-0) | gold powder (flakes) |
| (a-1) | silver powder (flakes) |
| (a-2-1) | copper powder (flakes) |
| (a-2-2) | copper powder (atomized) |
| (a-3) | iron powder (atomized) |
| (a-4) | zinc powder (atomized) |

(b) Organopolysiloxane (abbreviated as polysiloxane)
Vinyl-containing linear organopolysiloxane of the formula:

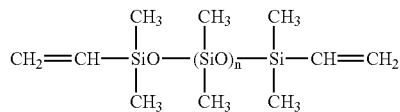

wherein n is such a number that the siloxane has a viscosity of 1000 cSt at 25° C.

(c) Organohydrogenpolysiloxane (abbreviated as hydrosiloxane)

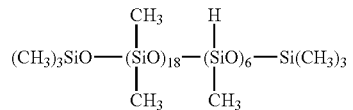

(d) Toluene solution of platinum-divinyltetramethyldisiloxane complex (abbreviated as platinum compound)
  platinum content: 0.5 wt %
(e) Silica
  (e-1) fumed silica, R8200 by Degussa
  (e-2) crystalline silica, Crystallite VXST by Tatsumori
(f) Cure regulating agent
  50% toluene solution of ethynyl cyclohexanol
(g) Adhesive agent

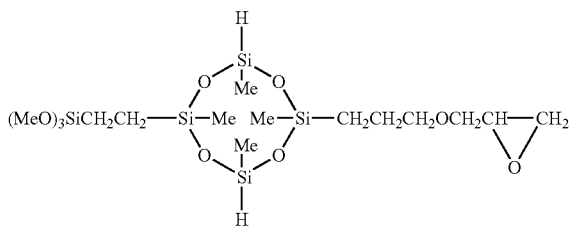

Me is methyl.

Corrosion Test

As shown in FIG. 1, a silver-plated copper plate 2 was placed in a glass vessel 1, a cured sheet 3 of the silicone rubber composition (0.8 mm thick) was placed over the vessel 1, and 0.10 g of sulfur powder 4 was rested on the sheet 3. The vessel 1 was closed with a metal cap 5. The vessel was held in a thermostat chamber at 70° C. for several days while the degree of corrosion on the silver plating was visually observed at suitable intervals. The sample was rated "O" for no corrosion and "X" for corrosion observed as blackening.

TABLE 1

| | | Comparative Example | | | Example | | | | | | | | | | | | |
|---|---|---|---|---|---|---|---|---|---|---|---|---|---|---|---|---|---|
| Components (pbw) | | 1 | 2 | 3 | 1 | 2 | 3 | 4 | 5 | 6 | 7 | 8 | 9 | 10 | 11 | 12 | 13 |
| a-0 | gold powder (flakes) | 50 | | | | | | | | | | | | | | | |
| a-1 | silver powder (flakes) | | | | 50 | | | | | | | | | | | | |
| a-2-1 | copper powder (flakes) | | | | | 50 | | | | | | | | | | | |
| a-2-2 | copper powder (atomized) | | 500 | | | | 1 | 10 | 50 | 100 | 300 | 500 | 500 | 500 | 500 | | |
| a-3 | iron powder (atomized) | | | | | | | | | | | | | | | | 50 | |
| a-4 | zinc powder (atomized) | | | | | | | | | | | | | | | | | 50 |
| b | polysiloxane | 100 | 100 | 100 | 100 | 100 | 100 | 100 | 100 | 100 | 100 | 100 | 100 | 100 | 100 | 100 | 100 |
| c | hydrosiloxane | 4 | 4 | 4 | 4 | 4 | 4 | 4 | 4 | 4 | 4 | 4 | 4 | 4 | 4 | 4 | 4 |
| d | platinum compound | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |

TABLE 1-continued

| Components (pbw) | Comparative Example 1 | 2 | 3 | Example 1 | 2 | 3 | 4 | 5 | 6 | 7 | 8 | 9 | 10 | 11 | 12 | 13 |
|---|---|---|---|---|---|---|---|---|---|---|---|---|---|---|---|---|
| e-1 fumed silica | | | | | | | | | | | 0.2 | 0.5 | 3 | | | |
| e-2 crystalline silica | | | | | | | | | | | | | | 3 | | |
| f cure regulating agent | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| g adhesive agent | 2 | 2 | 2 | 2 | 2 | 2 | 2 | 2 | 2 | 2 | 2 | 2 | 2 | 2 | 2 | 2 |
| Hardness* | 20 | 24 | 55 | 23 | 25 | 20 | 22 | 25 | 30 | 33 | 52 | 56 | 32 | 33 | 24 | 23 |
| Corrosion test Initial | ○ | ○ | ○ | ○ | ○ | ○ | ○ | ○ | ○ | ○ | ○ | ○ | ○ | ○ | ○ | ○ |
| after 6 hr | X | X | ○ | ○ | ○ | ○ | ○ | ○ | ○ | ○ | ○ | ○ | ○ | ○ | ○ | ○ |
| after 1 day | X | X | ○ | ○ | ○ | X | ○ | ○ | ○ | ○ | ○ | ○ | ○ | ○ | X | ○ |
| after 3 days | X | X | ○ | X | X | X | X | ○ | ○ | ○ | ○ | ○ | ○ | ○ | X | X |
| after 7 days | X | X | ○ | X | X | X | X | X | ○ | ○ | ○ | ○ | ○ | ○ | X | X |
| Volume resistivity ($\Omega \cdot cm$) | $8 \times 10^{14}$ | $2 \times 10^{12}$ | $2 \times 10^{6}$ | $2 \times 10^{13}$ | $3 \times 10^{13}$ | $7 \times 10^{14}$ | $2 \times 10^{14}$ | $6 \times 10^{12}$ | $5 \times 10^{11}$ | $3 \times 10^{10}$ | $3 \times 10^{9}$ | $8 \times 10^{11}$ | $6 \times 10^{14}$ | $2 \times 10^{13}$ | $6 \times 10^{13}$ | $3 \times 10^{13}$ |

*Hardness was measured by Durometer type A according to JIS K6249.

As seen from the Table, Comparative Example 2 using gold, i.e., the metal powder which is not sulfidable with sulfur gas, fails to retard the corrosion of inside silver plating whereas the sulfidable metal powders as typified by copper within the scope of the invention are effective for retarding the corrosion. It is also evident that the inclusion of at least 0.2 part, preferably at least 0.5 part of silica fines is effective in preventing the volume resistivity from lowering.

The silicone rubber compositions of the invention are used in the encapsulation of electric and electronic parts as the effective means for preventing metals from corrosion with sulfur-containing gas.

Japanese Patent Application No. 2001-291034 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of preventing or retarding corrosion by a sulfur-containing gas of electric and electronic parts, said method comprising
    sealing and encapsulating the electric and electronic parts with a cured product of a silicone rubber composition comprising
    (A) 0.5 to 90% by weight of a copper powder,
    (B) an organopolysiloxane containing at least two alkenyl radicals in a molecule,
    (C) an organohydrogenpolysiloxane containing at least two hydrogen atoms each attached to a silicon atom in a molecule, in an amount such that 0.5 to 4 mol of silicon-bonded hydrogen atoms in the organohydrogenpolysiloxane are available per mol of alkenyl radicals in the organopolysiloxane (B), and
    (D) a platinum group metal catalyst,
    the cured product of the composition being a non-conductive silicone rubber having a volume resistivity of at least $1 \times 10^{9}$ $\Omega \cdot cm$.

2. The method of claim 1, wherein the copper powder is sulfidable with a sulfur-containing gas into a copper sulfide powder which prevents or retards the sulfur-containing gas from reaching the electric and electronic parts.

3. The method of claim 1, wherein the silicone rubber composition further comprises (E) at least 0.2 part by weight of finely divided silica per 100 parts by weight of the organopolysiloxane (B).

4. The method of claim 1, wherein the silicone rubber composition further comprises (F) an adhesive agent having at least one functional radical selected from the group consisting of an epoxy, alkoxysilyl, carbonyl and phenyl radical.

5. The method of claim 1, wherein the silicone rubber composition is self-bondable to metals and/or organic resins.

6. The method of claim 1, wherein the content of copper in component (A) is 0.5 to 70% by weight.

7. The method of claim 1, wherein the content of copper in component (A) is 1 to 70% by weight.

* * * * *